(12) United States Patent
Lloyd

(10) Patent No.: US 7,237,100 B2
(45) Date of Patent: Jun. 26, 2007

(54) TRANSACTION REDIRECTION MECHANISM FOR HANDLING LATE SPECIFICATION CHANGES AND DESIGN ERRORS

(75) Inventor: Stacey G. Lloyd, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 10/045,564

(22) Filed: Jan. 9, 2002

(65) Prior Publication Data
US 2003/0131221 A1  Jul. 10, 2003

(51) Int. Cl.
*G06F 9/44* (2006.01)

(52) U.S. Cl. ................... 712/245; 712/226

(58) Field of Classification Search ............. 712/245, 712/244, 226, 209, 15, 212
See application file for complete search history.

(56) References Cited

U.S. PATENT DOCUMENTS

| | | | | |
|---|---|---|---|---|
| 3,889,242 | A * | 6/1975 | Malmer, Jr. ............. | 712/226 |
| 5,602,764 | A * | 2/1997 | Eskandari-Gharnin et al. .. | 708/210 |
| 5,790,843 | A * | 8/1998 | Borkenhagen et al. ...... | 712/226 |
| 5,796,972 | A * | 8/1998 | Johnson et al. ............. | 712/208 |
| 6,006,030 | A * | 12/1999 | Dockser ..................... | 712/227 |
| 6,304,477 | B1 * | 10/2001 | Naji ............................ | 365/50 |
| 6,427,202 | B1 * | 7/2002 | Richardson et al. ......... | 712/32 |

OTHER PUBLICATIONS

IBM Technical Disclosure Bulletin, vol. 37 No. 03. IBM Corp. Mar. 1994. Pages 321-324.*

"The PowerPC Architecture: A specification for a new family of RISC processors." Second Edition (May 1994), Morgan Kaufmann Publishers, Inc. Pages 19-23.*
Kime et al. "Logic and Computer Design Fundamentals: 2nd Edition." Prentice Hall, 2000. Pages 121-122.*
Handy, Jim, The Cache Memory Book, The authoritative reference on cache design, Academi Press, 1998, pp. 14-18.*
COMPARATOR definition, Computer Desktop Encyclopedia, copyright 1981-2004.
COMBINATIONAL (COMBINATORIAL) LOGIC definition, Computer Desktop Encyclopedia, copyright 1981-2004.

* cited by examiner

*Primary Examiner*—Eddie Chan
*Assistant Examiner*—Jacob Petranek
(74) *Attorney, Agent, or Firm*—Abdy Raissinia

(57) ABSTRACT

Redefined hardware structured transactions and the associated responses in a data processing device are made user programmable. Three registers, a identifier register, a mask register and a response register, are used to redirect transactions or other operations within an application specific integrated circuit after post-silicon testing has been completed and there is no opportunity to redirect the hardware logic contained therein. When enabled, the registers allow for the insertion of blank table entries that can be programmed at a later time to handle unexpected output responses which occur due to unforeseen problems in the preprogrammed operation of the device. Transaction redirection can be accomplished on selected fields of identified transactions. The method is applicable to any hardware device in which it is desired to redirect actions originally defined in look-up tables when such tables are not capable of adjustment or alteration without redesign or re-manufacture.

17 Claims, 2 Drawing Sheets

TRANSACTION REDIRECTION MECHANISM FOR HANDLING LATE SPECIFICATION CHANGES AND DESIGN ERRORS

CROSS-REFERENCE TO RELATED APPLICATIONS

U.S. patent application Ser. No. 10/045,795 by T. B. Berg et al. (BEA919990003US1) entitled "Method And Apparatus For Increasing Requestor Throughput By Using Data Available Withholding" was filed on Jan. 9, 2002

U.S. patent application Ser. No. 10/045,927 by T. B. Berg et al. (BEA920000017US1) entitled "Method And Apparatus For Using Global Snooping To Provide Cache Coherence To Distributed Computer Nodes In A Single Coherent System" was filed on Jan. 9, 2002.

U.S. patent application Ser. No. 10/045,821 by T. B. Berg et al. (BEA920000018US1) entitled "Multi-level Classification Method For Transaction Address Conflicts For Ensuring Efficient Ordering In A Two-level Snoopy Cache Architecture" was filed on Jan. 9, 2002.

U.S. patent application Ser. No. 10/045,797 by T. B. Berg et al. (BEA920000020US1) entitled "Method And Apparatus For Multi-path Data Storage And Retrieval" was filed on Jan. 9, 2002.

U.S. patent application Ser. No. 10/045,923 by W. A. Downer et al. (BEA920000021US1) entitled "Hardware Support For Partitioning A Multiprocessor System To Allow Distinct Operating Systems" was filed on Jan. 9, 2002.

U.S. patent application Ser. No. 10/045,925 by T. B. Berg et ad. (BEA920000022US1) entitled "Distributed Allocation Of System Hardware Resources For Multiprocessor Systems" was filed on Jan. 9, 2002.

U.S. patent application Ser. No. 10/045,926 by W. A. Downer et al. (BEA920010030US1) entitled "Masterless Building Block Binding to Partitions" was filed on Jan. 9, 2002.

U.S. patent application Ser. No. 10/045,774 by W. A. Downer et al. (BEA920010031US1) entitled "Building Block Removal From Partitions" was filed on Jan. 9, 2002.

U.S. patent application Ser. No. 10/045,796 by W. A. Downer et al. (BEA920010041US1) entitled "Masterless Building Block Binding To Partitions Using Identifiers And Indicators" was filed on Jan. 9, 2002.

BACKGROUND OF THE INVENTION

1. Technical Field

The present invention relates to a method and system for redefinition of permitted transactions and associated responses in a data processing system to avoid delay and cost impact from late specification changes in the design of application specific integrated circuits.

2. Background of the Related Art

In the planning of complex hardware for computer systems or other digital processing equipment; numerous and complex transactions are contemplated in the design of application specific integrated circuits (ASIC), used in the implementation of a system. Such ASIC devices may include memory controllers and other subsystem components designed for a particular data processing system In such data or information processing systems, it is not uncommon that there are late specification changes in the design process which result in system response errors that must be corrected.

For system speed and chip density purposes, system logic is normally formed and manufactured into an ASIC which, once manufactured, may not be altered or changed without going through a redesign process. Such a redesign usually is expensive in terms of retooling and retesting the ASIC. When the ASIC finally reaches post-silicon testing, it may be discovered that a transaction in the system design may not be handled correctly and may stop forward progress of the system development and testing. Such delays cause expense in terms of time to market and add additional development cost because of changes that would be required. There is presently no mechanism to allow simple and effective redefinition of allowed transactions and associated responses within a system so that an ASIC may continue to operate without production changes.

In the past, the problem described was commonly addressed by designers of complex transaction handlers by using various mechanisms. First, configuration bits on one or more internal registers can sometimes be used to change configurations of the system so that problematic transactions or system bugs which arise cannot occur. Using such configuration bits often reduce system performance, limit the features available or usability of the system as a whole.

Other means for addressing this problem has included micro sequencer based transaction handlers. This technique is based on execution of microcode and thus the system can be reprogrammed to handle any of the problematic cases that may arise after post manufacturing. While the solution is versatile, computer systems which use microcode are usually unable to achieve the same clock speeds and logic densities as hard coded logic which is the preferred environment of many systems today.

Also, the problem has been addressed by the implementation of external pin outputs that are connected to the internals of transaction handlers that can be used to change the response of the handler to specific and limited transaction problems. This latter technique of addressing the problem usually requires some ability to view internal transaction handler signals on physical pins introduced externally to the ASIC. This method of addressing the problem allows for the design of external hardware to generate the signals for the external pins. Further, the technique adds pins to the integrated circuit being designed and it is difficult, if not impossible, to provide fill performance at high clock speeds. All of the above current techniques have identified drawbacks which the present invention addresses.

SUMMARY OF THE INVENTION

A first aspect of the invention is found in a method for handling operations within a hardware device. The method provides within the device information regarding the operation, including information identifying the operation. At least some of the identifying information of the operation is selected, and based thereon, at least some of the information regarding the operation is converted. The operation is then executed based upon the converted information.

Another aspect of the invention is found in a data processing system for executing an operation. The system comprises an identification store including information identifying at least selected operations executable by the system, and a comparator responsive to the operation and the identifying information. The system contains a substitute operation responsive to the comparator and the operation.

Yet another aspect of the invention is a method for redirecting an operation within a hardware device. Operations occurring within the device contain fields of information regarding the operation. The operations are compared with a preprogrammed list of responses, and the hardware device issues responses based on each operation. The method creates a list of identified operations for which a redirected response is desired. The method then compares an operation with the list of identified operations, and substitutes a redirected response from said preprogrammed list of responses.

And yet another aspect of the invention is a method for redirecting transactions within a hardware device, wherein the transactions occurring within the device contain fields of information regarding the transaction. In this method, fields to identify a transaction are loaded into a first register, and selected of the fields of said first register are acted upon. Transaction information to be redirected through a preprogrammed value for each said field is converted, and new transaction results are output.

Thus, it is the object of the present invention to provide a method of designing application specific integrated circuits to include a means to allow the redefinition of allowed transactions and the associated responses within said integrated circuit in order to avoid delays of time and expense if it is necessary to provide for a redirection of a defined transaction. It is further the object of the present invention to provide a series of software registers within the design of an application specific integrated circuit to create a transaction identifier register, a transaction mask register, and a transaction response register, all interconnected to operate and provide for the redirection of internal transactions in the application specific integrated circuit by comparing current transactions with identified transactions and providing a pre-determined response for such transactions. It is also the object of the present invention to provide both a method and a means to redirect action from a predefined look-up table in any data processing system in which it may be desirable to redirect the preprogram or hardwire output response from any given input in such system.

Other objects, features and advantages of this invention will become apparent from the following detailed description of its presently preferred embodiment, taken in conjunction with the accompanying drawings.

DETAILED DESCRIPTION OF THE PREFERRED EMBODIMENT

Overview

Figure 1A:
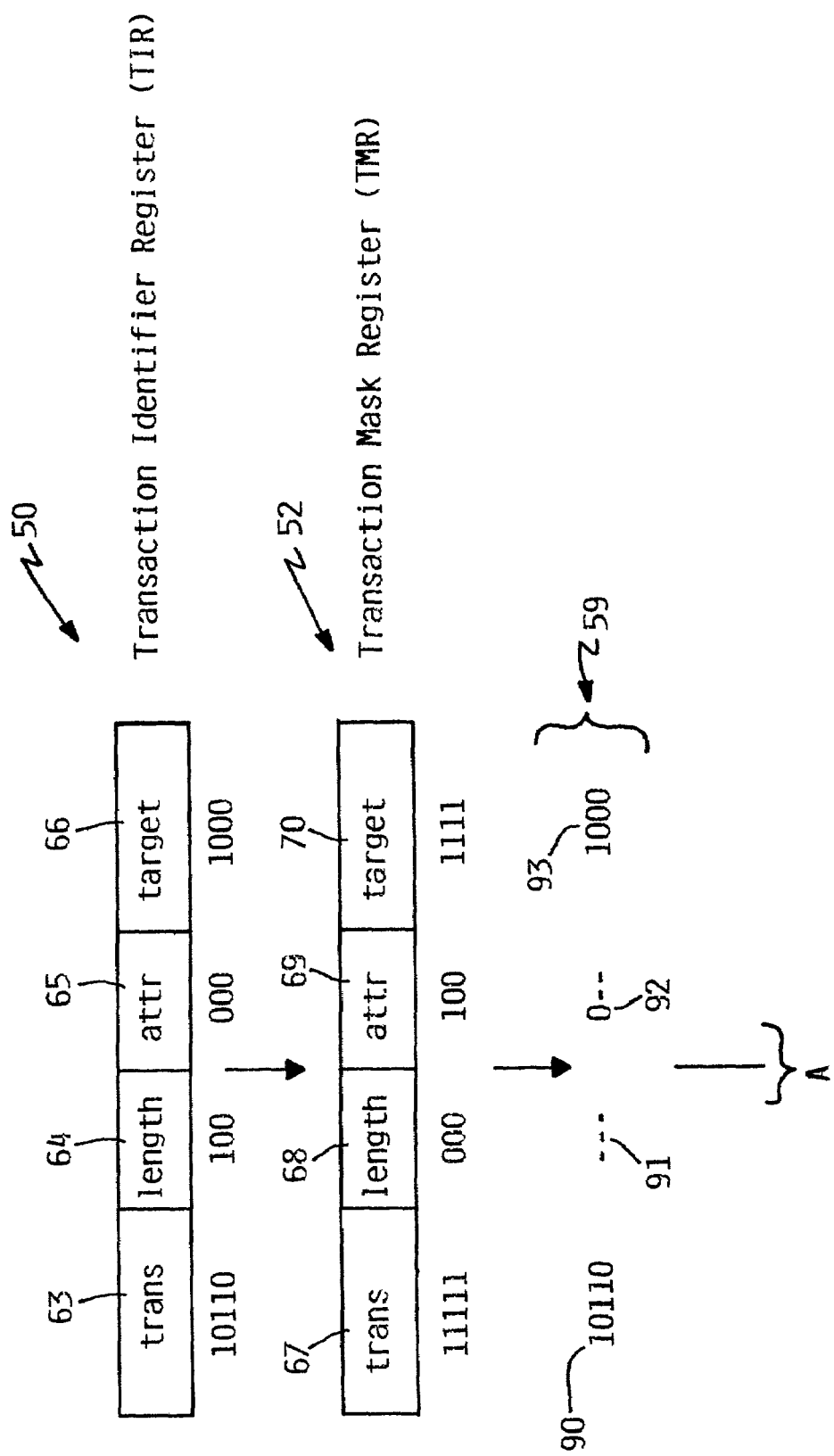
FIGS. 1A and 1B together form a logic diagram illustrating the operation of the apparatus and the method of the preferred embodiment of the invention.

The preferred embodiment of this invention provides blank data table entries which can be programmed after an application specific integrated circuit (ASIC) reaches post-silicon testing. The blank data table entries allow handling of unexpected operations or transactions. Storage means used with the method may be created through a variety of different hardware or software techniques. Identified operations within a predefined system of responsive outputs are redirected to such inputs by comparing current operations in a system with a list of identified operations and then selecting a predefined alternative response for such operation. A set of specific registers are created which provide for greater flexibility in the post-production operational alteration of an ASIC. The preferred embodiment utilizes three registers: a transaction identifier registers, a transaction mask register, and a transaction response register.

The first register, the transaction identifier register contains all of the data fields necessary to specifically identify a transaction, including whether it is a read or write, the length of the data, cache attributes, destination, or other information regarding the transaction.

The second register, the transaction mask register indicates which fields and bits within such fields in the first register are actually to be used for processing the redirection desired. Such second register allows the change in transaction response to apply to all reads to a specific destination regardless of the length of the field or cache attributes. The second register operates on the fields listed in the first register to provide control over a desired range of operations or transactions in which redirection of system responses is desired. The second register may also be limited to change only the response for an 8-byte uncacheable read to an input/output device.

The third register, the transaction response register contains the new values for all of the signals controlled by the transaction handler on which the method operates. When a matching transaction is identified by the first and second register pair, the transaction handler asserts the new values in response to the transaction thereby changing the response to the problematic transaction which appeared after the application specific integrated circuit has been manufactured.

Finally, a control bit is provided in the preferred embodiment to enable or disable operation of the redirection system, such that it may be bypassed if not necessary in post-silicon testing production.

Technical Background

In most computer systems, transactions occurring within the system which comprise the data flow are identified with a transaction number or a transaction data field enabled with binary code or other identifiers to keep track of the transaction. Transactions occur in computer systems in the normal course of operations on data, flowing between the system processor and the various other subsystems including memory, input/output devices and the like.

Many computer processing systems include memory control systems which work with one or more microprocessors to interface system memory to work with the processors. Such memory control systems are designed to provide direction and redirection to transactions as measured against a predefined look-up table or list of desired responses for a given defined transaction. In some instances, particularly in multinode computer systems, such memory control systems also communicate with other hardware devices such as a tag and address crossbar system as well as a data crossbar system. Memory control systems are frequently hardwired as an application specific integrated circuit, thereby allowing little flexibility after its design with respect to changes in transaction responses in a specific system designed around such integrated circuit.

Many memory control systems operate by comparing a current transaction identification with a transaction look-up table prewired into any integrated circuit to provide a standard output response for each transaction provided in the design of the chip by the system designers. In a situation where a specific transaction provides a response that is originally unexpected during the design process of the chip containing a transaction look-up table, it is desirable to allow the system to be designed in advance to accept a selectable or definable alternative transaction look-up table for identified problem transactions. In such a system, it is not necessary to redesign the application specific integrated circuit to change the transaction look-up table or engage in other fixes which would be less desirable.

Technical Details

Figure 1B:
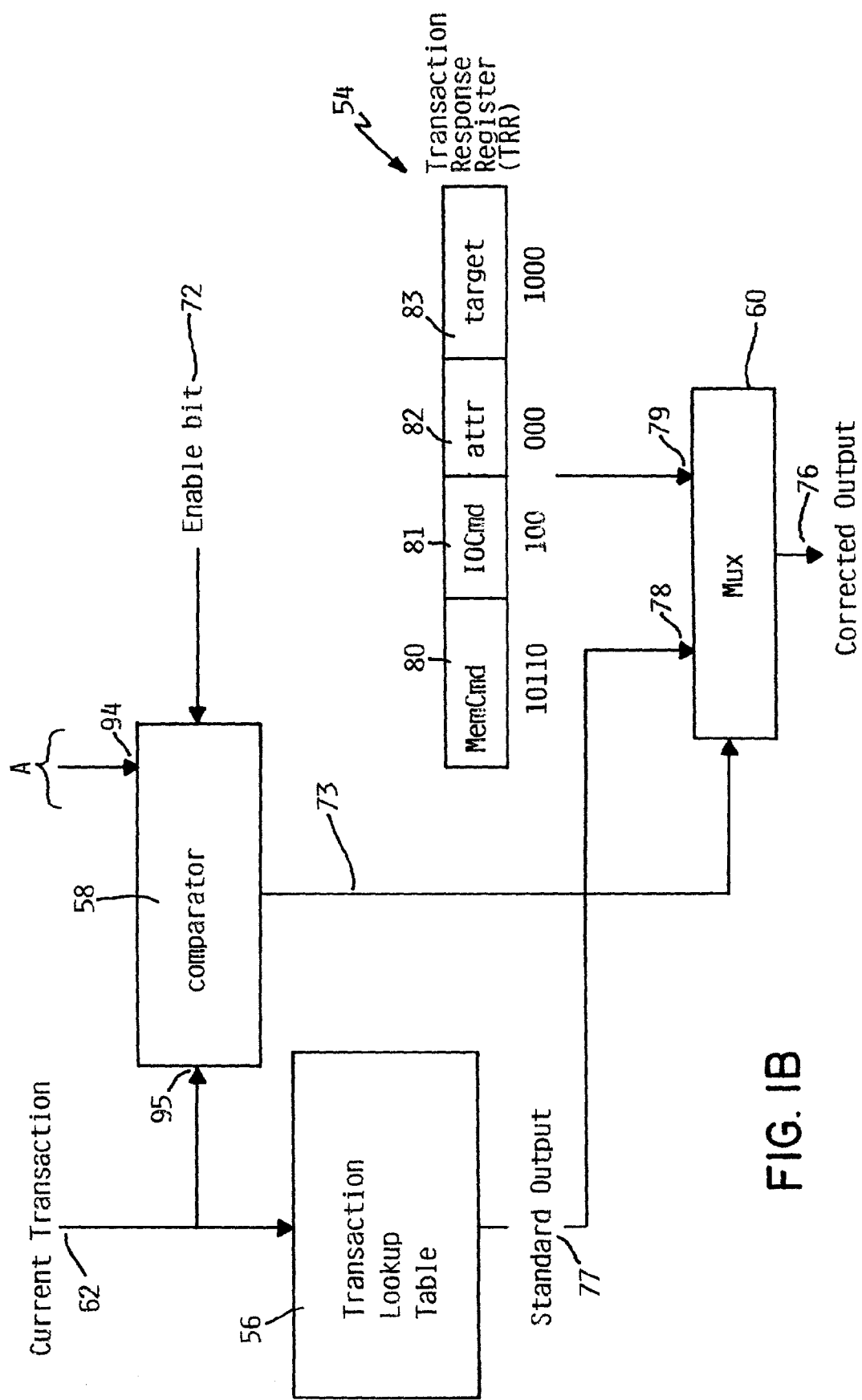

FIGS. 1A and 1B illustrate the logic architecture and the process used in the preferred embodiment. A current transaction 62 is measured against the transaction look-up table 56 providing a standard output 77 as a preprogrammed response to the specific transaction. In the embodiment as shown in FIGS. 1A and 1B, the current transaction 62 is also introduced into comparator 58 at input 95. Comparator 58, if enabled through bit 72, allows comparison of current transaction information input at 95, with information provided to the comparator at input 94.

Transaction identifier register (TIR) 50 is a software register designed to store the identification of those transactions identified in transaction look-up table 56 to provide a response that was unexpected or undesirable as the chip containing transaction look-up table 56. There may be a variety of different transactions that, during the testing stage, have been identified as transactions of a certain identification 63, length 64, attribute 65 or target address 66 for which it is desired that the response originally programmed in transaction look-up table 56 should be altered to a redefined response which is more desirable. Such identified transactions are loaded in TIR 50, and are communicated to transaction mask register (TMR) 52 which, as can be seen in FIGS. 1A and 1B, parallel the definitions of the fields shown in TIR 50. TMR 52 is comprised of a field for the transaction identifiers 67, the length 68, attribute 69 and target 70, similar to the fields shown in TIR 50.

TMR 52 allows for the selection of which bit, within the fields 63, 64, 65, and 66 in TIR 50, are acted upon or are of interest for the purpose of electing a new response for a given current transaction 62. When a bit is enabled in TMR 52 in each of its fields, (67, 68, 69 and 70), that bit acts as a filter for its corresponding bit in TIR 50 such that there must be a match exactly as presented in the corresponding bit in TIR 50. If a particular bit is set at zero in TMR 52, a "don't care" condition exists and the corresponding bit in TIR 50 is not filtered, but is instead ignored.

After TMR 52 operates on TIR 50, the pattern to match is presented by logic shown at 59. The patterns which are identified as requiring alteration shown in 59 consist of the same fields as TIR 50 and TMR 52. The transaction identification 90, length 91, attribute 92 and target 93 are presented to comparator input 94 to be compared against the current transaction 62 introduced to comparator 58 at 95. Accordingly, comparator 58 decides whether the current transaction matches the identification of a transaction to which an alternative transaction response is desired.

The effective logic carried out by comparator 58 is defined by: Output Response 73=(Current Transaction 62 XNOR TIR 50) OR NOT(TMR 52). Mux control 73 (TRUE or FALSE) is determined by the exclusive NOR of the bits of current transaction 62 with the bits of TIR 50 and then (logically) OR'd with the inversion of the bits in TMR 52. By way of example, if all the bits are '1' in the end then comparator output 73 is TRUE (this is a bit-wise (logical) AND of the result).

If the fields of the current transaction 62 matches any pattern which is loaded into TIR 50 as processed by TMR 52, the preferred embodiment identifies that an alternate response is necessary. Comparator 58 provides an output response at 73 to multiplexor (Mux) 60 which is then enabled to utilize an alternative transaction response as opposed to the standard output 77. Without comparator 58 intervention, Mux 60 would accept the standard output introduced to Mux 60 at 78.

If a transaction is identified as fitting the criteria selected by TIR 50 and TMR 52, the transaction response register (TRR) 54 provides an alternative response, preprogrammed or otherwise loaded with the desired, different response than the original transaction or response which would have been provided through the transaction look-up table 56. Accordingly, when transactions identified as requiring alterations are processed through the system, the corrected output at 76 will provide a new desired response as listed in register 54. It will be appreciated that all other transactions in which the response on transaction look-up table 56 are correct will be presented at standard output 77 in the normal course.

As can be seen, the application of TIR 50, TMR 52 and TRR 54 allow a combination which provides enhanced flexibility to correct problem responses to a designed transaction look-up table 56 which cannot be altered once an ASIC has been committed to silicon. Only those responses to problem transactions defined in TIR 50, as further defined by TMR 52, will evoke a response from TRR 54.

The logic diagram illustrated on FIGS. 1A and 1B will now be used to provide an example of the operation of the preferred embodiment. TIR 50 is shown in the diagram with binary code below each field which would be used in the example. Transaction field 63 is loaded with the binary transaction identifier 10110. TMR 52 has its transaction field 67 switched to 11111. Since field 67 and TMR 52 have their bits all selected on, or enabled, the transaction identifier in field 63 will be passed through TMR 52 exactly as presented, and transaction identification 90 shown at 59 will appear unchanged from the transaction identifier in field 63. Moving to TIR 50 length at field 64, the bits entered in the example are 100. Since TMR 52 has 000 selected in its length field 68, the result of field 68 operating on field 64 is a "don't care" as depicted by common nomenclatures shown at 91 at 59. Accordingly, it will be appreciated that the transaction identified in TIR 50 at field 63 can be of any length in field 64 and not be further filtered or expanded by any operation of TMR 52 because its length field 68 has none of its enabled to further operate on field 64.

Continuing with the example shown in FIGS. 1A and 1B TIR 50 is showing the transaction attribute field 65 of value 000. TMR 52 has its attribute field 69 selected at 100. The results of the operation require the first bit of field 65 to be conveyed at 69 as shown at 92. However, since the remaining two bits of field 69 are set at 0, it can be seen that the results in the next two bits at 92 is a "don't care" condition. Accordingly, any transaction with a leading bit attribute at field 65 will meet the criteria to be selected, the next two bits in field 65 will not make a difference in the identified transaction to be redirected. Continuing with the example, the target field 66 in TIR 50 uses an example field of 1000. Field 70 of TMR 52 has its four bits all enabled, that is selected to 1111 thereby requiring that the resultant output at field 93, at 59 is conveyed exactly as presented in field 66.

TRR 54 is comprised of four fields, memory command 80, input/output (IO) command 81, attribute field 82, and target field 83. If a particular transaction is identified as a transaction requiring an alternate response, that is, different from the response originally programmed in transaction look-up table 56 TRR 54 provides the new response. The desired redirected response is loaded in TRR 54 to be communicated to input 79 at Mux 60 to present the corrected output 76. As described earlier, such redirected response from TRR 54 is only presented when comparator 58 recognizes that the current transaction matches the transaction output by the resulting signal from logic 59.

Advantages

Utilizing the redirection mechanism described above, it is also possible to define desired transaction responses for identified transactions which themselves may not have been programmed into or designed into transaction look-up table 56. In the event that the transaction look-up table 56 is committed to silicon in the development of a specialized integrated circuit or any hardwired component, and it is determined that a transaction or other condition or state exists, the response for which has not been programmed or considered initially in the design of transaction lockup table 56, the present system and method can be used to define a response, thereby invoking a redirected output from TRR 54 to provide a desired response.

Alternatives

While three different registers are shown for the purpose of describing the operation of the preferred embodiment, it can also be appreciated that there may be one physical register that may be designed to perform the functions of TIR 50, TMR 52 and TMR 54 without being separate physical devices or registers. The entire method and system may be contained in a logic device which performs the operations of TIIR 50, TMR 52 and the comparator 58. Further, more than one set of registers can be applied to the same lookup table to allow for adding or correcting more than one lookup table entry. It will be evident to those skilled in the art that the entire process may be carried out in one or more specialized components which perform essentially the same functions as the logic illustrated in FIGS. 1A and 1B. The implementation of the design presented will depend on the complexity of look-up table 56 in a particular system, as well as the register size limits for the technology being used to implement the preferred embodiment described.

TIR 50 can also include response fields. For example, a field within TIR 50 which indicates whether a system had a hit on a address conflict queue can be included as a condition for redirection, even though such a field may relate to a different type of lookup structure as compared to the disclosure above describing the preferred embodiment. Adapting the invention to this alternative structure, for example, a redirected response would be presented if a certain response to the specified transaction occurs. Other such similar uses for the invention will be evident to those skilled in the art. Moreover, while the logic diagram in FIGS. 1A and 1B discloses one way to utilize the invention, other logic structures which carry out the functions which are described in the disclosure will also be apparent to those skilled in the art. Such alternate means to carry out the invention are considered to be within the scope of the parent invention which fully encompasses such other embodiments.

I claim:

1. A method for handling operations within a hardware device, comprising:
    providing within the device information regarding an operation, the operation having a predetermined responsive output as encoded within a transaction lookup table and an alternative responsive output stored in a register, the provided information including information identifying the operation;
    selecting at least some of the identifying information of the operation to output to a comparator and the transaction lookup table, by employing a masking register that filters the at least some of the identifying information of the operation for output to the comparator, the masking register being logically AND'ed with all the identifying information of the operation and having binary ones corresponding to the at least some of the identifying information to output to the comparator and binary zeros corresponding to other of the identifying information not output to the comparator, output of the comparator and output of the transaction lookup table being input into a multiplexer;
    selecting the alternative responsive output for the operation instead of the predetermined responsive output based upon the comparator comparing the selected identifying information to the operation resulting in a match between the selected identifying information and the operation directing the multiplexer to output the alternative responsive output, such that the multiplexer effectively converts at least some of the information regarding the operation based upon the selected identifying information; and
    executing the operation based upon the converted information.

2. The method of claim 1, wherein the provided information is within a register of the device.

3. The method of claim 1, wherein the identifying information is within a register of the device.

4. The method of claim 1, wherein the converted information is within a register of the device.

5. The method of claim 1, wherein the step of providing information regarding the operation comprises providing the predetermined responsive output and the alternative responsive output.

6. The method of claim 5, wherein the operation identifications comprise fields for operation identification, length, attribute and target of each operation.

7. A method for redirecting transactions within a hardware device, wherein transactions occurring within said device contain fields of information regarding the transaction, the method comprising the steps of:
    loading all of said fields necessary to identify a transaction into a first register;
    selecting which fields of said first register are to be acted upon and inputting the selected fields into a multiplexer, the fields of said first register selected by employing a masking register that filters the fields of said first register, the masking register being logically AND'ed with the said first register and having binary ones corresponding to the fields being selected and binary zeros corresponding to the fields not selected;
    converting the transaction information to be redirected through a pre-programmed value for each said field by inputting into the multiplexer a predetermined responsive value into the multiplexer, the predetermined responsive value stored in a transaction lookup table, and an alternative responsive output stored in the first register, such that the multiplexer receives the alternative responsive output as input from the first register, the multiplexer also receiving input from a comparator, such that the multiplexer outputs the alternative responsive value for the transaction based upon the comparator comparing the selected fields to the transaction resulting in a match;

outputting corrected transaction results, as one of the predetermined responsive value and the alternative responsive output; and executing the corrected transactions results.

8. The method of claim 7, wherein said fields of information are comprised of a field for transaction identification, length, attribute and target of each transaction.

9. A method for redirecting operations within a hardware device, wherein operations occurring within said device contain fields of information regarding the operation and such operations are compared with a preprogrammed list of responses and the hardware device issues responses based on each operation, the method comprising the steps of:

creating a list of identified operations for which a redirected response is desired, the redirected response stored in a register and the preprogrammed list of responses stored in a transaction lookup table;

comparing an operation with the list of said identified operations using a comparator, the operation compared using the comparator by first employing a masking register that filters at least some of identifying information of the operation for use by the comparator, the masking register being logically AND'ed with all the identifying information of the operation and having binary ones corresponding to the at least some of the identifying information for use by the comparator and binary zeros corresponding to other of the identifying information not used by the comparator;

outputting match results of the comparator and a preprogrammed response from the preprogrammed list of responses for the operation into a multiplexer, such that output of the multiplexer represents the redirected response for the operation;

substituting the redirected response for the preprogrammed response from said preprogrammed list of responses; and executing the redirected response of the operation.

10. The method of claim 9, wherein the step of creating a list of identified operations includes first loading transaction identification.

11. The method of claim 9, wherein said fields of information are comprised of a field for transaction identification, length, attribute and target of each transaction.

12. In a data processing system in which a given operation results in a predetermined response, a system for altering such predetermined response comprised of:

first storage means to identify operations for which a response different from said predetermined response is desired;

comparator means to compare said given operation with said identified operations, the given compared using the comparator means by first employing a masking register that filters at least some of identifying information of the operation for use by the comparator means, the masking register being logically AND'ed with all the identifying information of the operation and having binary ones corresponding to the at least some of the identifying information for use by the comparator means and binary zeros corresponding to other of the identifying information not used by the comparator means;

second storage means to load a substitute response for said predetermined response, the second storage means comprising a plurality of registers, the substitute response stored in a register and the predetermined response stored in a transaction lookup table; and selection means to select said substitute response when a given operation meets a predefined criteria for substituting a response from said second storage means, the selection means comprising a multiplexer into which the predetermined response is input and output from the plurality of registers is input, such that output of the comparator means is employed to select the output of the plurality of registers in lieu of the predetermined response as the substitute response.

13. The system of claim 12, wherein one or more of said storage means may be selectively enabled or disabled.

14. In a data processing system utilizing a hardware control device in which a given operation results in a predetermined response for that operation, a system for providing a programmable redefinition of allowed instructions and associated responses within said hardware device including:

first register means which contains fields to identify preselected operations which may occur within the system;

second register means which operates upon selected fields in the first register means to further define a criteria for which redirecting a response is desired, the second register means being a masking register that filters the selected fields of the first register means, the masking register being logically AND'ed with all the fields of the first register means and having binary ones corresponding to the selected fields and binary zeros corresponding to other of the fields;

comparator means which compares the identified operations with a current operation;

transaction lookup table means to output a standard value for the current operation; and multiplexer means receiving input from the comparator means and the transaction lookup table means and outputting a substitute value for a predetermined value for the current operation, the substitute value stored in a register and the predetermined value stored in a transaction lookup table.

15. The system of claim 14, wherein one or more of said register means may be selectively enabled or disabled.

16. A data processing system for executing an operation, comprising:

an identification store including information identifying at least selected operations by employing a masking register that filters at least some of the information of the selected operations, the masking register being logically AND'ed with all the information of the selected operations and having binary ones corresponding to the at least some of the information and binary zeros corresponding to other of the information of the selected operations;

a comparator responsive to the operation and the identifying information;

a substitute value responsive to the comparator and the operation and stored in a register;

a standard value responsive to the comparator and the operation and stored in a transaction lookup table; and a multiplexer into which the substitute value, the standard value, and output from the comparator are input, and that outputs one of the substitute value and the standard value based on the output from the comparator.

17. The system of claim 16, wherein the comparator is responsive to a mask of the identifying information.

* * * * *